United States Patent
Lee et al.

(10) Patent No.: US 10,841,872 B2
(45) Date of Patent: Nov. 17, 2020

(54) METHOD AND DEVICE BY WHICH TERMINAL PERFORMS MOBILITY

(71) Applicant: LG Electronics Inc., Seoul (KR)

(72) Inventors: Youngdae Lee, Seoul (KR); Sangwon Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 16/089,264

(22) PCT Filed: Mar. 28, 2017

(86) PCT No.: PCT/KR2017/003324
§ 371 (c)(1),
(2) Date: Sep. 27, 2018

(87) PCT Pub. No.: WO2017/171354
PCT Pub. Date: Oct. 5, 2017

(65) Prior Publication Data
US 2019/0132790 A1 May 2, 2019

Related U.S. Application Data

(60) Provisional application No. 62/335,706, filed on May 13, 2016, provisional application No. 62/330,795, (Continued)

(51) Int. Cl.
*H04W 48/18* (2009.01)
*H04W 76/30* (2018.01)
(Continued)

(52) U.S. Cl.
CPC ............ *H04W 48/18* (2013.01); *H04W 8/08* (2013.01); *H04W 76/10* (2018.02); *H04W 76/27* (2018.02);
(Continued)

(58) Field of Classification Search
CPC ..... H04W 48/18; H04W 76/30; H04W 76/27; H04W 76/10; H04W 8/08; H04W 36/0069; H04W 80/02
(Continued)

(56) References Cited

U.S. PATENT DOCUMENTS

2013/0084858 A1   4/2013 Ramasamy et al.
2015/0327129 A1   11/2015 Faccin et al.
(Continued)

FOREIGN PATENT DOCUMENTS

KR   100761697   9/2007
KR   20110011281  2/2011

OTHER PUBLICATIONS

International Search Report in International Application No. PCT/KR2017/003324. dated Jun. 2, 2017, 4 pages.

*Primary Examiner* — Yemane Mesfin
*Assistant Examiner* — Intekhaab A Siddiquee
(74) *Attorney, Agent, or Firm* — Fish & Richardson P.C.

(57) ABSTRACT

Provided are a method by which a terminal performs mobility in a wireless communication system and a device supporting same. The method may comprise the steps of: establishing a connection with a master eNB (MeNB); setting a mobility rule for a cell list associated with a secondary eNB (SeNB) and cells associated with the SeNB; on the basis of the mobility rule, selecting at least one cell from the cells included in the cell list; and notifying the SeNB of the selected at least one cell.

14 Claims, 14 Drawing Sheets

Related U.S. Application Data filed on May 2, 2016, provisional application No. 62/314,344, filed on Mar. 28, 2016.

(51) Int. Cl.
| | |
|---|---|
| *H04W 76/27* | (2018.01) |
| *H04W 8/08* | (2009.01) |
| *H04W 76/10* | (2018.01) |
| *H04W 36/00* | (2009.01) |
| *H04W 80/02* | (2009.01) |
| *H04W 8/18* | (2009.01) |

(52) U.S. Cl.
CPC ........ *H04W 76/30* (2018.02); *H04W 36/0069* (2018.08); *H04W 80/02* (2013.01)

(58) Field of Classification Search
USPC .......................................................... 370/329
See application file for complete search history.

(56) References Cited

U.S. PATENT DOCUMENTS

| | | | |
|---|---|---|---|
| 2016/0057687 A1 | 2/2016 | Horn et al. | |
| 2016/0095004 A1* | 3/2016 | Tseng .................... | H04W 48/00 370/228 |
| 2016/0242080 A1* | 8/2016 | Vikberg ............ | H04W 36/0027 |
| 2017/0223763 A1* | 8/2017 | Rahman .............. | H04W 74/004 |
| 2018/0359790 A1* | 12/2018 | Ingale .................... | H04W 8/24 |

* cited by examiner

METHOD AND DEVICE BY WHICH TERMINAL PERFORMS MOBILITY

CROSS-REFERENCE TO RELATED APPLICATIONS

This application is a National Stage application under 35 U.S.C. § 371 of International Application No. PCT/KR2017/003324, filed on Mar. 28, 2017, which claims the benefit of U.S. Provisional Application No. 62/335,706, filed on May 13, 2016, U.S. Provisional Application No. 62/330,795, filed on May 2, 2016, and U.S. Provisional Application No. 62/314,344, filed on Mar. 28, 2016. The disclosures of the prior applications are incorporated by reference in their entirety.

BACKGROUND OF THE INVENTION

Field of the Invention

The present invention relates to a wireless communication system and, more particularly, to a method for a UE to perform mobility and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

SUMMARY OF THE INVENTION

With the introduction of a new radio access technology (RAT), it is necessary to propose a new UE mobility procedure.

According to an embodiment, there is provided a method for performing, by a UE, mobility in a wireless communication system. The method may include: establishing a connection with a master eNB (MeNB); configuring a cell list related to a secondary eNB (SeNB) and a mobility rule for a cell related to the SeNB; selecting at least one cell among cells comprised in the cell list based on the mobility rule; and notifying the SeNB of the at least one selected cell.

The method may further include: transmitting information indicating a cell configured as a PSCell among the at least one selected cell to the MeNB or the SeNB. Alternatively, the method may further include: receiving information indicating a cell configured as a PSCell among the at least one selected cell from the MeNB or the SeNB.

The at least one selected cell may be notified to the SeNB through a cell addition message. The cell addition message may include user data.

The MeNB may be an LTE base station (BS), and the SeNB may be a new RAT (NR) BS.

The at least one selected cell may be notified to the MeNB by the SeNB. Alternatively, the the at least one selected cell may be notified to the SeNB via the MeNB.

The cell list related to the SeNB and the mobility rule for the cell related to the SeNB may be configured by the MeNB or the SeNB.

The mobility rule may include a threshold related to channel quality used to select the at least one among the cells included in the cell list.

The method may further include releasing the at least one selected cell based on the mobility rule.

The method may further include notifying the SeNB of the at least one released cell, wherein the at least one released cell may be notified to the MeNB by the SeNB. Alternatively, the method may further include notifying the MeNB of the at least one released cell, wherein the at least one released cell may be notified to the SeNB by the MeNB.

The UE may perform network-controlled mobility in the MeNB, and may perform UE-centric mobility in the SeNB.

According to another embodiment, there is provided a UE for performing mobility in a wireless communication system. The UE may include: a memory; a transceiver; and a processor to connect the memory and the transceiver, wherein the processor may be configured to control the transceiver to: establish a connection with a MeNB; configure a cell list related to a SeNB and a mobility rule for a cell related to the SeNB; select at least one cell among cells comprised in the cell list based on the mobility rule; and notify the SeNB of the at least one selected cell.

It is possible to perform a UE-centric mobility procedure.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
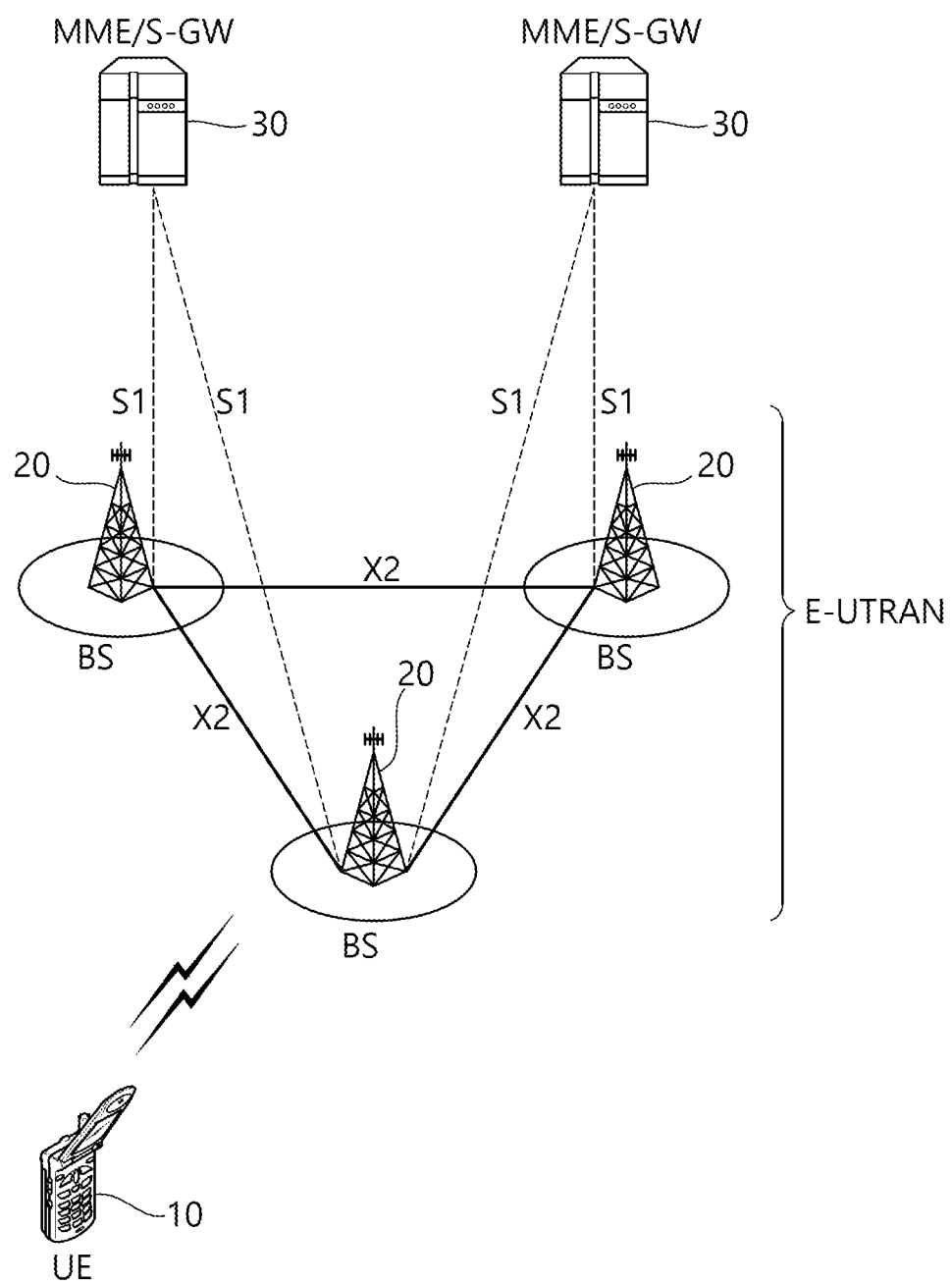
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
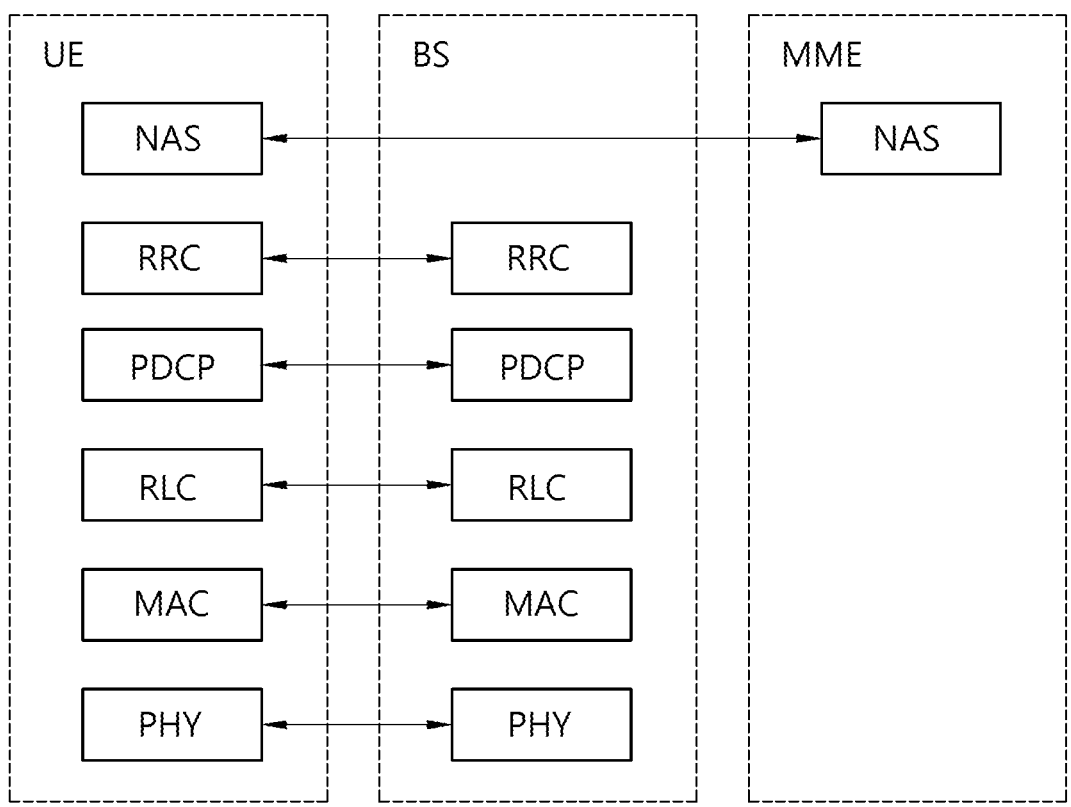
FIG. 2 shows a control plane of a radio interface protocol of an LTE system.
Figure 3:
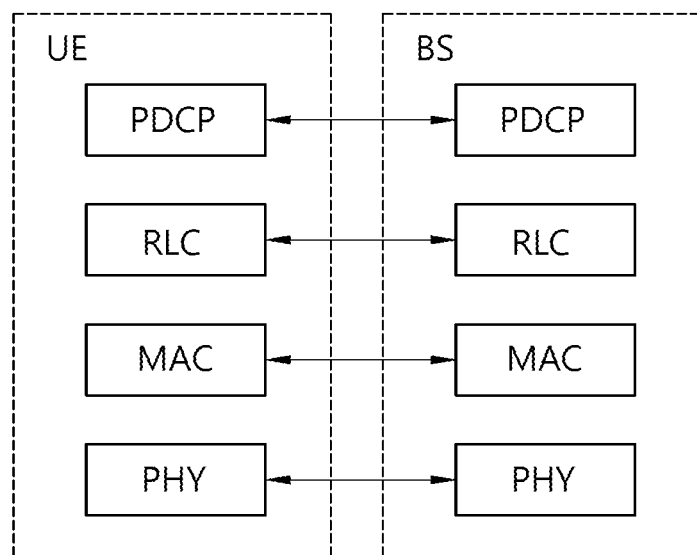
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G RAN Deployment Scenario will be Described.

A 5G RAN may be classified into a 'non-centralized deployment' scenario, a 'co-sited deployment with E-UTRA' scenario, and a 'centralized deployment' scenario according to a shape of deploying a function of a base station in a central unit and a distributed unit and according to whether it coexists with a 4G base station. In this specification, the 5G RAN, a gNB, a next generation node B, a new RAN, and a new radio base station (NR BS) may imply a newly defined base station for 5G. In addition, a basic function to be supported by the 5G RAN may be defined by Table 1.

TABLE 1

| Function group similar to E-UTRAN | |
|---|---|
| Function similar to E-UTRAN | Synchronization, Paging, Connection, Handover, Load balancing, Radio access network sharing, etc. |
| First new RAN function group | |
| Support network Slicing | Capable of supporting core network slice of RAN |
| Tight Interworking | Dual connectivity, Data flow aggregation function between 4 G and 5 G eNBs |
| Multi-connectivity | Function of simultaneously connecting one New RAN node and multiple New RAN nodes through Data flow combination |
| Support multi-RAT handover | Handover function through new direct interface (xX) between eLTE eNB and gNB |
| Second new RAN function group | |
| UE Inactive mode | Function enabling direct connection when new traffic occurs in UE in a state where a radio access resource is released and a wired connection (gNB-NGC) is established |
| Direct service | D2D improvement function |
| Non-3GPP Interworking | Interworking function between Non-3GPP(e.g., WLAN) and NR |
| Support Inter-RAT handover through Core | Support handover between E-UTRA and NR through Core |

Figure 4:
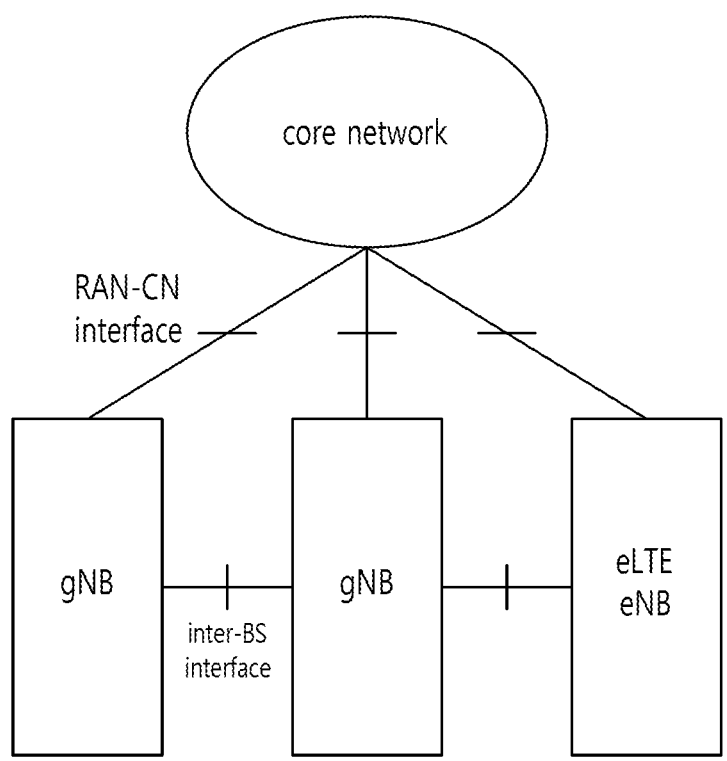
FIG. 4 shows a non-centralized deployment scenario.

FIG. 4 shows a non-centralized deployment scenario.

Referring to FIG. 4, a gNB may be configured in a horizontal manner without being split in a layered manner such as a CU and a DU. In this case, a protocol stack of a full set may be supported in each gNB. The non-centralized deployment scenario may be suitable for a macro cell or indoor hotspot environment. The gNB may be directly connected to another gNB or an eLTE eNB through an inter-BS interface. The gNB may be directly connected to a core network through an RAN-CN interface.

Figure 5:
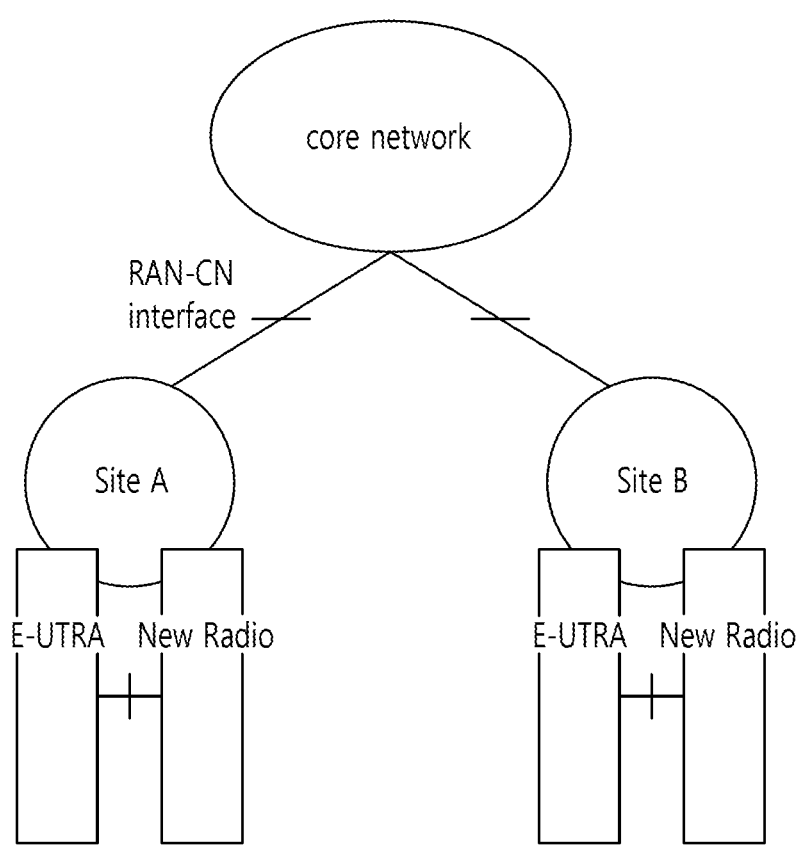
FIG. 5 shows a 'co-sited deployment with E-UTRA' scenario.

FIG. 5 shows a 'co-sited deployment with E-UTRA' scenario.

Referring to FIG. 5, a 5G transmission scheme (e.g., new radio) and a 4G transmission scheme (e.g., E-UTRAN) may be used together in one co-sited deployment. The co-sited deployment scenario may be suitable for an urban macro environment. When a gNB configuration is controlled by utilizing load balancing and multi-connectivity, the co-sited deployment scenario can utilize all frequency resources allocated to 4G/5G, and can extend cell coverage for a subscriber located at a cell boundary by using a low frequency.

Figure 6:
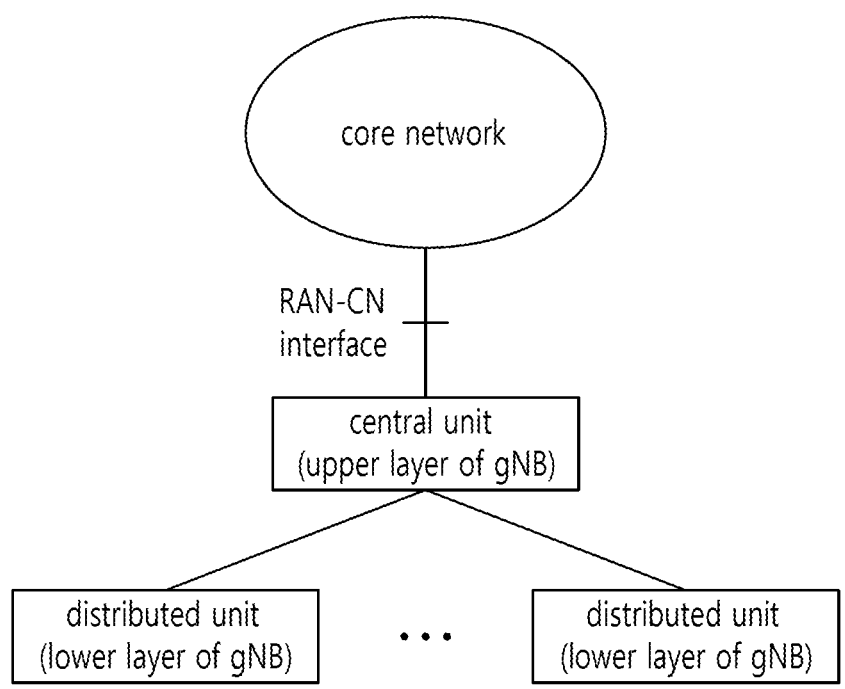
FIG. 6 shows a centralized deployment scenario.

FIG. 6 shows a centralized deployment scenario.

Referring to FIG. 6, a gNB may be split into a CU and a DU. That is, the gNB may operate by being split in a layered manner. The CU may perform a function of upper layers of the gNB, and the DU may perform a function of lower layers of the gNB. The centralized deployment scenario may be classified into a high performance transport type and a low performance transport type according to transmission capacity and delay characteristics of a transport device which connects the CU and the DU.

When the transport requires high performance, the CU accommodates many functions from the upper layer to the lower layer, whereas the DU accommodates only relatively a small number of lower layers in comparison with the CU. Therefore, processing of the CU may be overloaded, and it may be difficult to satisfy a requirement for transmission capacity, delay, and synchronization of the transport device. For example, when most of layers (RRC layers to physical layers) are deployed in the CU and only an RF function is deployed to the DU, it is estimated that a transmission band of the transport device is 157 Gbps and a maximum delay is 250 us, and thus the transport device requires an optical network with high capacity and low delay. On the other hand, since a transmission delay is short, when an optimal scheduling scheme is used, there is an advantage in that cooperative communication (e.g., CoMP) between gNBs can be more easily realized.

When the transport requires low performance, the CU accommodates an upper layer protocol function having a slightly low processing load, and thus there is room in the transmission capacity and delay of the transport device. For example, when only at least the upper layer (RRC layer) is deployed in the CU and all lower layers (PDCP layer to RF) lower than that are deployed in the DU, it is estimated that the transmission band of the transport device is 3 to 4 Gbps and the maximum delay is 10 ms. Therefore, there is room in the transmission band and the delay in comparison with the transport requiring high performance.

Hereinafter, Network Slicing Will be Described.

Major distinctive features of 5G systems are flexibility and adaptability to network functions and services. One key concept for achieving flexibility is network slicing. Using network slicing makes it possible to efficiently support various requirements for a network.

Network slicing means that one physical network is divided into a plurality of logical networks including particular network functions to provide various services of different characteristics. Here, isolation between different network slices may be required so that a service provided by one network slice does not affect a service provided by another network slice.

Generally, a service for a user may be provided by one network slice operated by a network operator. However, a particular user may simultaneously connect one or more network slices in order to use services of various characteristics, such as mobile broadband (MBB) and critical communication. When the particular user attempts to connect to one or more networks slice at the same time, the network operator needs to prevent signaling procedures from overlapping.

Figure 7:
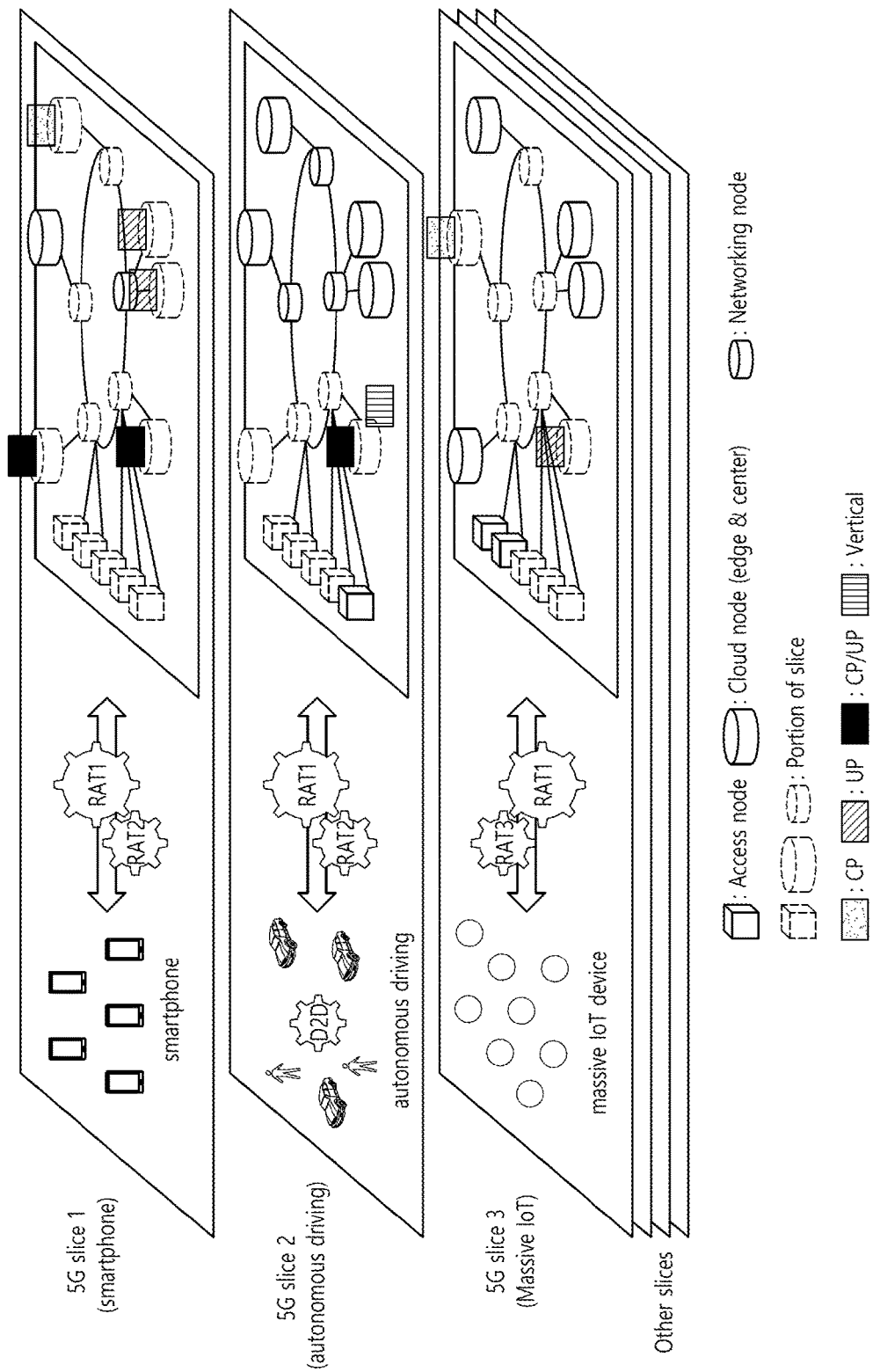
FIG. 7 shows an example of network slicing.

FIG. 7 shows an example of network slicing.

Referring to FIG. 7, one physical network may be sliced into logical networks, such as slice 1 for supporting a smartphone, slice 2 for supporting autonomous driving, slice 3 for supporting massive IOT, and other slices for supporting other services. Thus, for example, when the network receives a request for autonomous driving, slice 2 may be selected.

Each slice is assured of a resource (e.g., a resource in a virtualized server and a virtualized network resource). Further, since the slices are isolated from each other, an error or a failure that occurs in a particular slice does not affect communication in a different slice. For example, even though a failure occurs in slice 1 for supporting a smartphone, the failure occurring in slice 1 does not affect the other slices, and thus an autonomous driving service and a massive IoT service may be normally performed.

Figure 8:
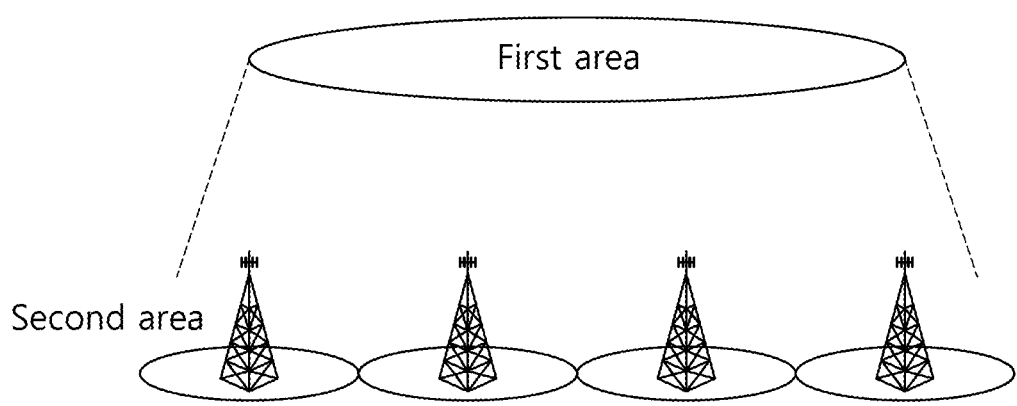
FIG. 8 shows a scenario in which BSs are hierarchically deployed.

FIG. 8 shows a scenario in which BSs are hierarchically deployed.

Referring to FIG. 8, a first area may include one or more second areas. The first area may be an area served by a first BS, and the one or more second areas may be areas served respectively by one or more second BSs. For example, the first BS may be a central unit (CU), and the second BSs may be a distributed unit (DU). In this case, the first area is an area served by the CU, and the one or more second areas may be areas served respectively by one or more DUs. In the present specification, a DU and a remote unit (RU) may be used to indicate the same concept.

Hereinafter, a UE mobility procedure will be described in a scenario where BSs are hierarchically deployed according to an embodiment of the present invention. For the convenience of description, the following description is made on the mobility of a UE in a scenario where a CU and one or more DUs are hierarchically deployed, but the technical idea of the present invention is not limited to the scenario where the CU and the one or more DUs are hierarchically deployed. The UE mobility procedure proposed below may be applied to various scenarios where cells or BSs are hierarchically deployed.

A DU may specialize in a particular service or particular application. For example, a DU may specialize in a delay-sensitive service or application. The delay-sensitive service or application may be a vehicle-to-everything (V2X) application, a vehicle-to-vehicle (V2V) application, or a group communication application. Further, a particular DU may specialize in a broadcast service or application. The broadcast service or application may be an MBMS service or a public safety application.

Figure 9:
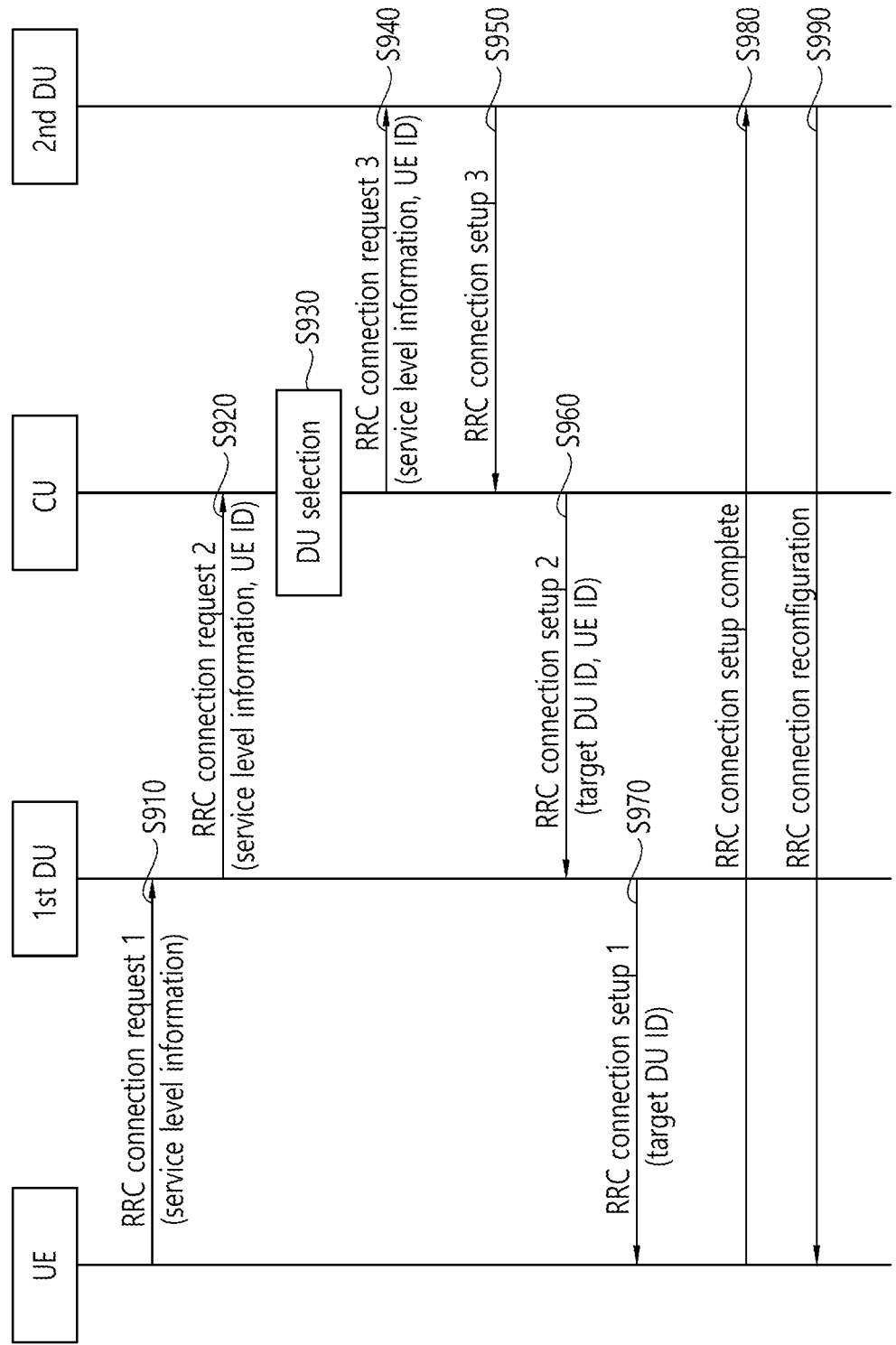
FIG. 9 illustrates network-based mobility according to an embodiment of the present invention.

FIG. 9 illustrates network-based mobility according to an embodiment of the present invention.

Referring to FIG. 9, in step S910, a UE may transmit an RRC (radio) connection request message to a serving DU. In the embodiment of FIG. 9, the serving DU may be a first DU. The UE may be in an RRC (Radio)-idle mode. The RRC connection request message may include service/application level information. For example, the service/application level information may be information about a service/application in which the UE is interested. When the UE is interested in various types of services/applications, the UE may notify the serving DU of all services/applications of interest.

In step S920, the serving DU may transmit a UE identity (ID) along with the received RRC connection request message to a CU.

In step S930, the CU may select one or more DUs considering the UE ID and the service/application of interest. For example, the core network can know which DU specializes in which service/application. Accordingly, the core network may select a DU suitable for the service/application in which the UE is interested. In this step, the core network may obtain user information (e. g., user class) from a home subscriber server (HSS) and may select a DU according to the user information. When the received RRC connection request message includes one or more services/applications, the core network may select one or more DUs. The one or more selected DUs may be referred to as a target DU. In the embodiment of FIG. 9, the target DU may be a second DU.

In step S940, the core network may transmit the UE ID along with the received RRC connection request message to the one or more selected DUs.

In step S950, the one or more selected DUs may reply to the request from the CU by transmitting an RRC connection setup message. Preferably, in this step, the one or more selected DUs may reject the RRC connection request.

In step S960, upon receiving the RRC connection setup message from the one or more selected DUs, the CU may transmit the RRC connection setup message to the serving DU. The RRC connection setup message may include an ID of the one or more selected DUs.

In step S970, the serving DU may transmit the RRC connection setup message to the UE.

In step S980, the UE may complete the RRC connection establishment procedure by transmitting an RRC connection setup complete message to the one or more selected DUs. SRB1 may be established between the UE and the one or more selected DUs.

Figure 10:
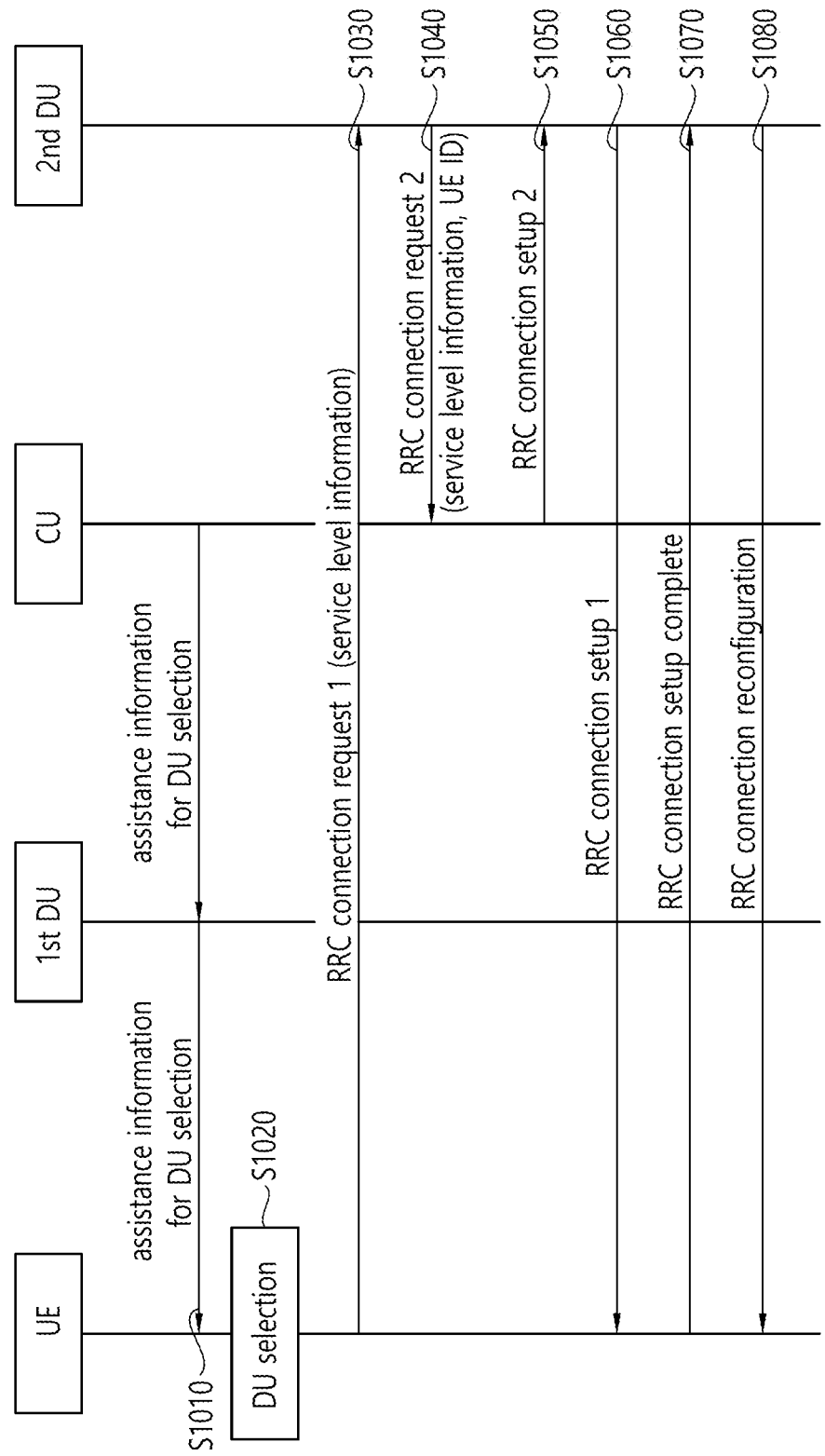
FIG. 10 illustrates UE-based mobility according to an embodiment of the present invention.

FIG. 10 illustrates UE-based mobility according to an embodiment of the present invention.

Referring to FIG. 10, in step S1010, a UE in the RRC-idle mode may receive assistance information from a serving DU. The assistance information may be received via broadcast signaling. The assistance information may include at least one of a service/application type or a DU ID. In the embodiment of FIG. 10, the serving DU may be a first DU.

In step S1020, the UE may select a DU based on a service/application of interest and the received assistance information. When the UE is interested in one or more services/applications, the UE may select one or more DUs. In the embodiment of FIG. 10, it is assumed that the UE selects a second DU based on the service/application of interest and the received assistance information.

In step S1030, the UE may transmit an RRC connection request message to the one or more selected DUs.

In step S1040, the one or more selected DUs may transmit an RRC connection request message including a UE ID to a CU.

In step S1050, the CU may reply to the request from the one or more selected DUs by transmitting an RRC connection setup message. Preferably, the CU may reject the RRC connection request message from the one or more selected DUs.

In step S1060, upon receiving the RRC connection setup message from the CU, the one or more selected DUs may transmit the RRC connection setup message to the UE. In the embodiment of FIG. 10, steps S1040 and S1050 may be performed after step S1060.

In step S1070, the UE may complete the RRC connection establishment procedure by transmitting an RRC connection setup complete message to the one or more selected DUs. SRB1 may be established between the UE and the one or more selected DUs.

Figure 11:
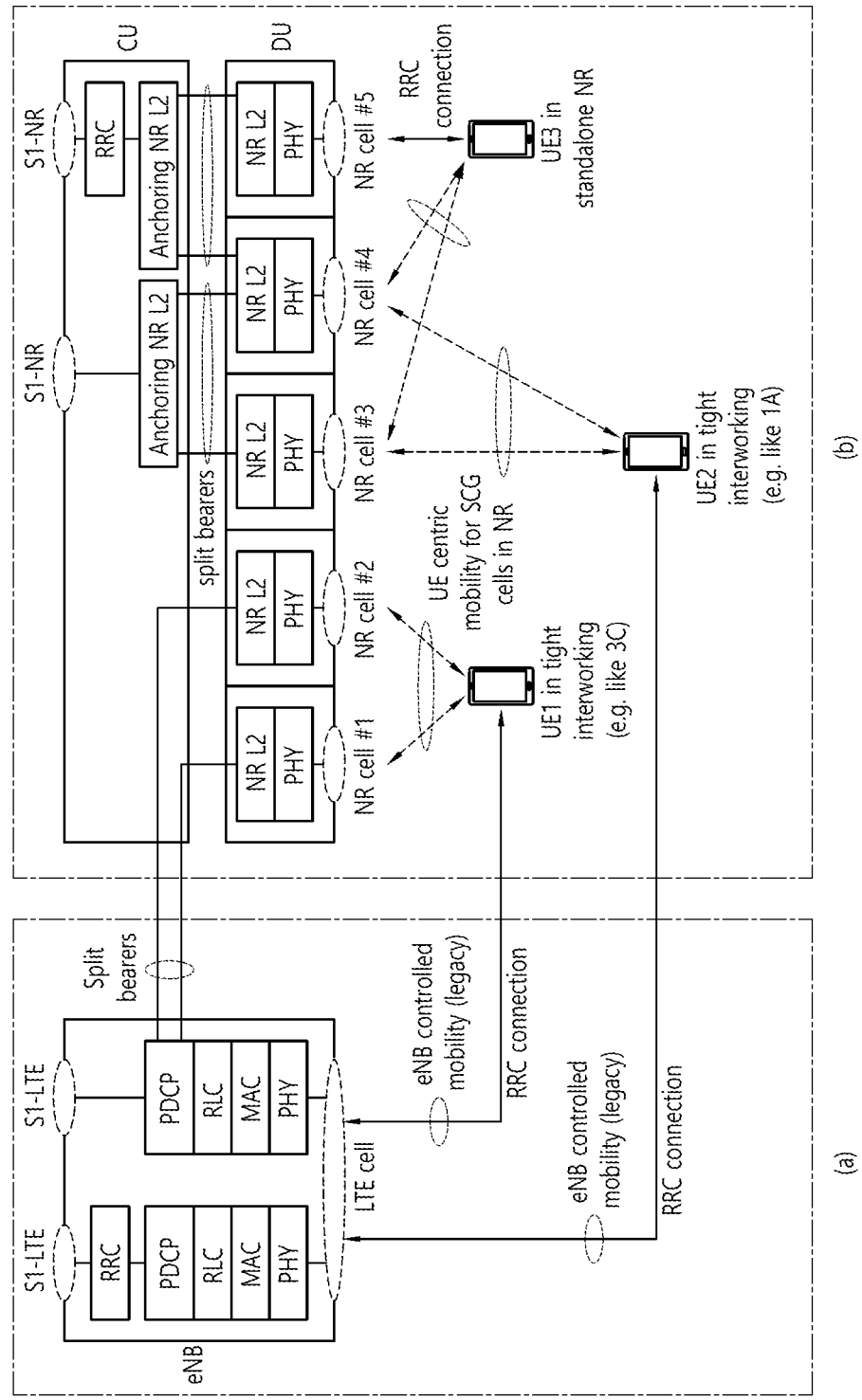
FIG. 11 shows a UE mobility procedure according to an embodiment of the present invention.
Figure 12:
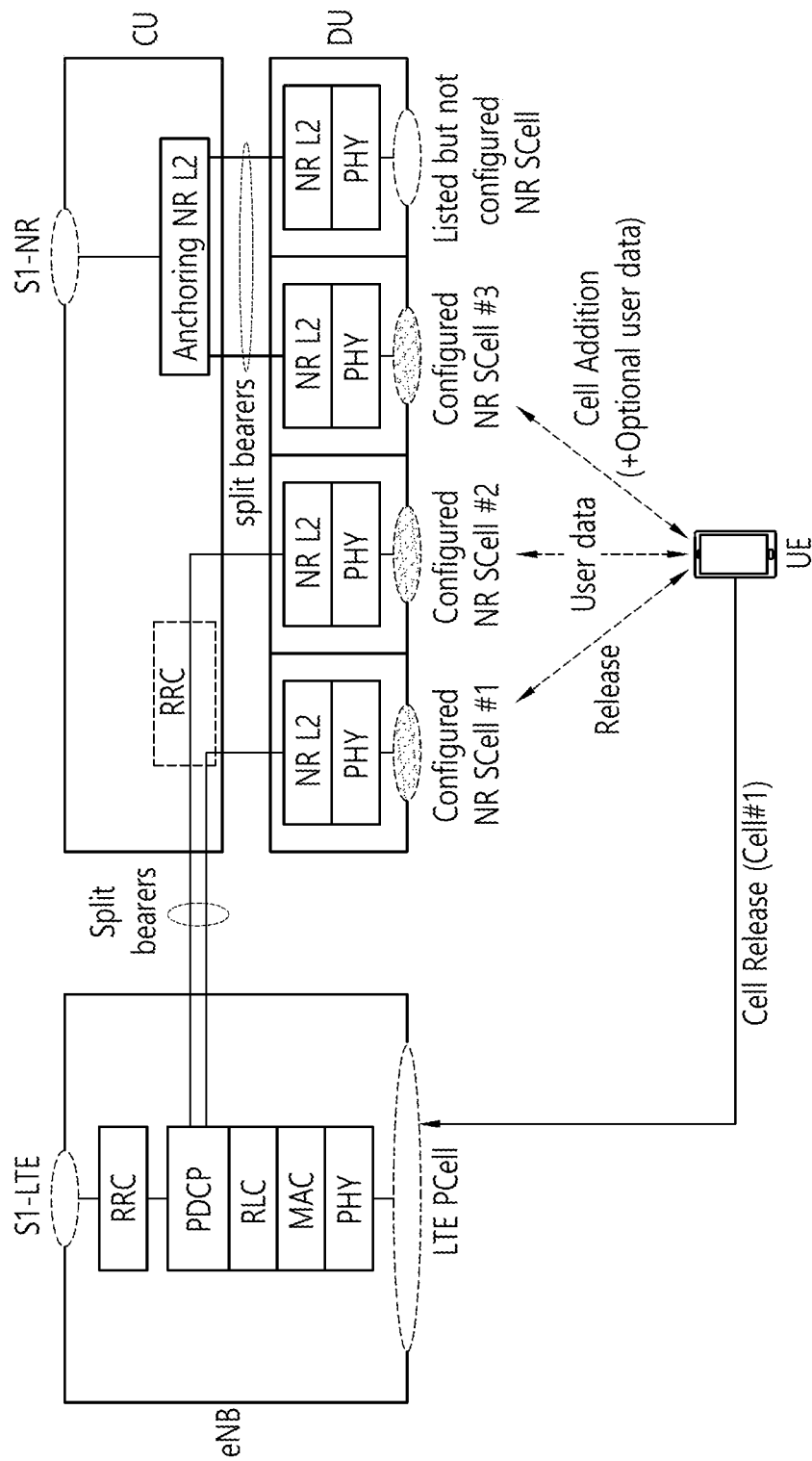
FIG. 12 shows a process for UE-centric cell addition and cell release according to an embodiment of the present invention.

FIG. 11 shows a UE mobility procedure according to an embodiment of the present invention. Specifically, FIG. 11(a) shows that network-controlled mobility is performed according to an embodiment of the present invention, and FIG. 11(b) shows that UE-based mobility is performed according to an embodiment of the present invention. FIG. 12 shows a process for UE-centric cell addition and cell release according to an embodiment of the present invention.

According to an embodiment of the present invention, a UE may perform network-controlled mobility towards a first set of cells. On the other hand, the UE may perform UE-based mobility or UE-centric mobility toward a second set of cells. The first set of cells and the second set of cells may be considered as different cell groups.

The cell groups may be either a master cell group (MCG) or a secondary cell group (SCG). When the first set of cells is considered as an MCG controlled by a master eNB (MeNB), the second set of cells may be considered as an SCG controlled by a secondary eNB (SeNB). When the first set of cells is considered as an SCG, the second set of cells may be considered as an MCG. Alternatively, when the first set of cells is considered as a PCell, the second set of cells may be considered as a SCell. When the first set of cells is considered as a SCell, the second set of cells may be considered as a PCell.

The first set of cells and the second set of cells may support different radio interfaces. For example, the first set of cells may operate on an LTE radio interface, while the second set of cells may operate on a new RAT interface.

In the present specification, a UE may have an RRC/NAS connection with the first set of cells but may not have an RRC/NAS connection with the second set of cells. In this case, a signaling radio bearer may be established only with the first set of cells. Alternatively, the UE may have an RRC/NAS connection with the first set of cells and may also have an RRC/NAS connection with the second set of cells. In this case, different signaling radio bearers may be established with the first set of cells and the second set of cells, respectively.

In the present specification, a BS may be an LTE BS. Alternatively, the BS may be a new RAT BS that includes both a CU and one or more DUs. Alternatively, the BS may be a new RAT BS that includes either a CU or a DU. When the BS is a new RAT BS, the BS may include a CU and a DU. Alternatively, when the BS is a new BS and is particularly served as a SeNB, the BS may be either a CU or a DU.

Referring to FIG. 11(a), for the first set of cells, network-controlled mobility may be performed. The first set of cells may be a set of cells on LTE. The first set of cells may be MCG cells by a MeNB. Alternatively, the first set of cells may be a PCell. A UE mobility procedure for the first set of cells may include at least one of the following steps.

(1) Step 1: When any one of the cells transmits the configuration of a measurement report to the UE, the UE may configure a measurement report. The one of the cells may be any one of a plurality of MCG cells or any one of a plurality of SCG cells.

(2) Step 2: When a reporting criterion is satisfied, the UE may transmit the measurement report.

(3) Step 3: When one of the cells transmits a handover command to the UE, the UE may perform handover to a target cell.

(4) Step 4: The UE may synchronize to a downlink in the target cell.

(5) Step 5: The UE may transmit a handover complete to the target cell.

Referring to FIG. 11(b), for the second set of cells, UE-centric mobility may be performed. The second set of cells may be a set of cells on a new RAT. The new RAT may be a 5G RAN. The second set of cells may be SCG cells by a SeNB. Alternatively, the second set of cells may be a SCell. A UE mobility procedure for the second set of cells may include at least one of the following steps.

(1) Cell list configuration step: When the MeNB or SeNB transmits at least one of a cell list, a mobility rule, and a configuration related to split bearers to the UE, the UE may configure a cell list that can be configured as the second set of cells set. The cell list may be either a list of SCG cells or a list of SCells.

The mobility rule may include a threshold related to channel quality. The threshold related to the channel quality may be used for the UE to select at least one of cells listed in the cell list. Such cell selection may include not only initial cell selection but also cell reselection.

The mobility rule may include a timer related to the selection of at least one cell among the cells listed in the cell list.

The mobility rule may be generated by the SeNB and may be forwarded to the MeNB.

For example, the split bearers may be set as shown in FIG. 11 or FIG. 12.

In the cell list configuration step, as illustrated in FIG. 11 or 12, the BS (and the UE) may configure a split bearer for a signaling radio bearer and a data radio bearer for the MCG cell and the listed SCG cells. Alternatively, the BS (and the UE) may configure a split bearer for a signaling radio bearer and a data radio bearer for the PCell and the listed SCells.

(2) Cell selection step: The UE may select or reselect one or more cells based on the quality of the listed cells and the mobility rule. For example, referring to FIG. 11(b), based on the quality of new RAT (NR) cell #1, NR cell #2, NR cell #3, NR cell #4, and NR cell #5, which are listed, and the mobility rule, UE 1 having an RRC connection with an LTE cell may select NR cell #1 and NR cell #2, UE 2 having an RRC connection with the LTE cell may select NR cell #3 and NR cell #4, and UE 3 having an RRC connection with NR cell #5 may select NR cell #3 and NR cell #4.

When the UE selects a cell for the second set of cells, the UE may configure the selected cell as a new SCG cell or a new SCell while keeping other configured SCG cells.

When the UE reselects a cell for the second set of cells, the UE may configure the reselected cell as a new SCG cell or a new SCell and may release the other cell belonging to the second set of cells. That is, the UE may select only one cell in the second set of cells but may perform make-before-break cell reselection for the second set of cells.

This cell selection/reselection does not affect the MCG cell and the PCell.

In the cell selection step, as illustrated in FIG. 11 or 12, the UE may configure a split bearer for a signaling radio bearer and a data radio bearer for the MCG cell and the listed SCG cells. Alternatively, the BS and the UE may configure a split bearer for a signaling radio bearer and a data radio bearer for the PCell and the listed SCells.

(3) Cell addition step: The UE may transmit a cell addition message to the selected cell. For example, referring to FIG. 12, the UE may transmit a cell addition message to configured NR SCell #3. The selected cell may include not only an initially selected cell but also a reselected cell. Alternatively, the UE may transmit a cell addition message to any one cell belonging to the first set of cells. Alternatively, the UE may transmit a cell addition message to any one cell belonging to the second set of cells.

When the SeNB receives the cell addition message, the SeNB may forward the cell addition message to the MeNB. Alternatively, when the SeNB receives the cell addition message, the SeNB may notify the MeNB of the cell selected by the UE. The cell selected by the UE may include not only a cell initially selected by the UE but also a cell reselected by the UE.

When the MeNB receives the cell addition message, the MeNB may forward the cell addition message to the SeNB. Alternatively, when the MeNB receives the cell addition message, the MeNB may notify the SeNB of the cell selected by the UE. The cell selected by the UE may include not only a cell initially selected by the UE but also a cell reselected by the UE.

The cell addition message may be any one of an RRC message, an NAS message, a layer 2 control signal, such as an MAC control element, and a layer 1 control signal, such as a PUCCH When the UE transmits the cell addition message to the network, the UE may include user data in the cell addition message. For example, the user data may be transmitted via a signaling radio bearer. For example, referring to FIG. 12, when a cell addition message is transmitted to NR SCell #3 configured by the UE, user data may be additionally included in the cell addition message. Alternatively, when the UE transmits the cell addition message to the network, the UE may multiplex the cell addition message and user data into a single packet data unit (PDU) and/or one transmission. For example, the user data may be transmitted via a data radio bearer When the user data is transmitted through a data split radio bearer, the user data may be forwarded to a PDCP layer of the MeNB or an anchoring NR layer 2 entity as shown in FIG. 11 or 12. When the user data is included in the cell addition message, the user data may be forwarded to the MeNB.

The UE may directly indicate to the MeNB or the SeNB which cell among the one or more configured SCG cells is configured as a PSCell. For example, an indicator indicating which cell is configured as a PSCell may be included in the cell addition message. Alternatively, the MeNB or SeNB may indicate to the UE which cell among the one or more configured SCG cells is configured as a PSCell. For example, an indicator indicating which cell is configured as a PSCell may be included in a cell addition confirm message transmitted by the MeNB or SeNB in response to the cell addition message.

(4) Cell release step: The UE may decide to release or may release one or more cells based on the quality of the configured cell and the mobility rule. Then, the UE may notify the BS of the release of the cell. The release of the cell may be notified by transmitting a cell release message directly to the MeNB or SeNB. For example, referring to FIG. 12, the UE may decide to release NR SCell #1 based on the quality of configured NR Scell #1, NR SCell #2, and NR SCell #3 and the mobility rule. Then, the UE may notify NR SCell #1 or LTE PCell of the release of the cell.

When the SeNB receives the cell release message, the SeNB may forward the cell release message to the MeNB. Alternatively, when the SeNB receives the cell release message, the SeNB may notify the MeNB of the cell that the UE has released. Alternatively, when the SeNB receives the cell release message, the SeNB may notify the MeNB of the cell the UE has decided to release. When the SeNB notifies the MeNB of the cell that the UE has decided to release, the MeNB may transmit a cell release confirm message to the UE, and the UE may release the cell that the UE has decided to release.

When the MeNB receives the cell release message, the MeNB may forward the cell release message to the SeNB. Alternatively, when the MeNB receives the cell release message, the MeNB may notify the SeNB of the cell that the UE has released. Alternatively, when the MeNB receives the cell release message, the MeNB may notify the SeNB of the cell the UE has decided to release. When the MeNB notifies the SeNB of the cell that the UE has decided to release, the SeNB may transmit a cell release confirm message to the UE, and the UE may release the cell that the UE has decided to release.

The UE may directly indicate to the MeNB or the SeNB which cell among the one or more configured SCG cells is configured as a PSCell. For example, an indicator indicating which cell is configured as a PSCell may be included in the cell release message. Alternatively, the MeNB or SeNB may indicate to the UE which cell among the one or more configured SCG cells is configured as a PSCell. For example, an indicator indicating which cell is configured as a PSCell may be included in a cell release confirm message transmitted by the MeNB or SeNB in response to the cell release message.

According to the procedures proposed in the present specification, UE-centric mobility and network-controlled mobility may be applied at the same time.

Figure 13:
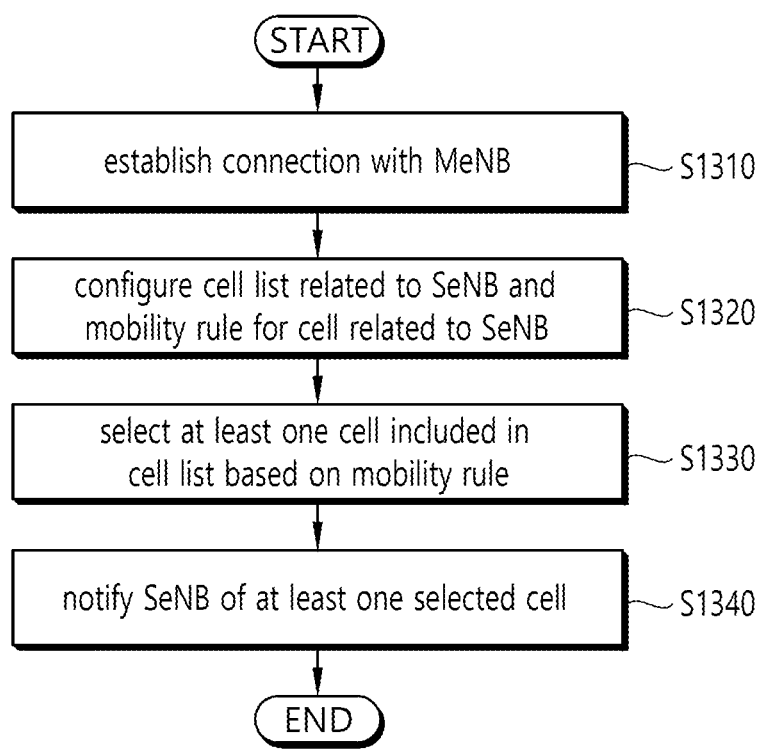
FIG. 13 is a block diagram illustrating a method for a UE to perform mobility according to an embodiment of the present invention.

FIG. 13 is a block diagram illustrating a method for a UE to perform mobility according to an embodiment of the present invention.

Referring to FIG. 13, in step S1310, the UE may establish a connection with a MeNB. The MeNB may be an LTE BS. The UE may perform network-controlled mobility in the MeNB.

In step S1320, the UE may configure a cell list related to a SeNB and a mobility rule for a cell related to the SeNB. The SeNB may be an NR BS. The cell list related to the SeNB and the mobility rule for the cell related to the SeNB may be configured by the MeNB or the SeNB. The mobility rule may include a threshold related to channel quality used to select at least one included in the cell list.

In step S1330, the UE may select at least one cell included in the cell list based on the mobility rule. The UE may perform UE-centric mobility in the SeNB.

In step S1340, the UE may notify the SeNB of the at least one selected cell. The at least one selected cell may be notified to the SeNB through a cell addition message. Further, the cell addition message may include user data. The at least one selected cell may be notified to the MeNB by the SeNB. Alternatively, the at least one selected cell may be notified to the SeNB via the MeNB.

In addition, the UE may transmit information indicating a cell configured as a PSCell among the at least one selected cell to the MeNB or the SeNB. Alternatively, the UE may receive information indicating a cell configured as a PSCell among the at least one selected cell from the MeNB or the SeNB.

In addition, the UE may release the at least one selected cell based on the mobility rule. The UE may notify the SeNB of the at least one released cell, and the at least one released cell may be notified to the MeNB by the SeNB. Alternatively, the UE may notify the MeNB of the at least one released cell, and the at least one released cell may be notified to the SeNB by the MeNB.

Figure 14:
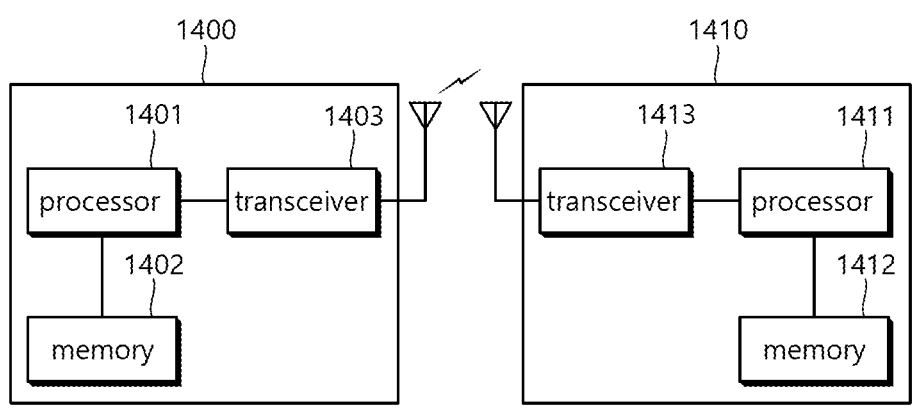
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402 and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the base station may be implemented by the processor 1401.

A UE 1410 includes a processor 1411, a memory 1412 and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the UE may be implemented by the processor 1411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), mobility in a wireless communication system, the method comprising:
   establishing a connection with a master base station (BS) including a source cell and a target cell;
   receiving a measurement configuration, from the master BS via the source cell;
   transmitting a measurement report based on the measurement configuration, to the master BS via the source cell;
   receiving a handover command message based on the measurement report, from the master BS via the source cell;
   performing a handover from the source cell to the target cell, based on the handover command message;
   transmitting a handover complete message, to the master BS via the target cell;
   receiving a configuration related to UE-centric mobility, wherein the configuration includes a list of cells related to a secondary BS and a mobility rule including a threshold related to channel quality for the cells;
   selecting at least one cell among the cells based on a quality of the cells and the threshold, without receiving a command related to the selection of the at least one cell from the master BS; and
   transmitting a cell addition message including information related to the at least one selected cell, to the secondary BS.

2. The method of claim 1, further comprising:
   transmitting information related to a cell configured as a PSCell among the at least one selected cell, to the master BS or the secondary BS.

3. The method of claim 1, further comprising:
   receiving information related to a cell configured as a Primary Secondary Cell (PSCell) among the at least one selected cell, from the master BS or the secondary BS.

4. The method of claim 1, wherein the cell addition message includes user data.

5. The method of claim 1, wherein the master BS is an LTE base station (BS), and the secondary BS is a new RAT (NR) BS.

6. The method of claim 1, wherein the information related to the at least one selected cell is transmitted to the master BS by the secondary BS.

7. The method of claim 1, wherein the information related to the at least one selected cell is transmitted to the secondary BS via the master BS.

8. The method of claim 1, wherein the list of cells and the mobility rule are configured by the master BS or the secondary BS.

9. The method of claim 1, wherein the threshold related to the channel quality is used by the UE for selecting the at least one cell among the cells included in the list of cells.

10. The method of claim 1, further comprising:
    releasing the at least one selected cell based on the mobility rule.

11. The method of claim 10, further comprising:
    transmitting information related to the at least one released cell, to the secondary BS,
    wherein the information related to the at least one released cell is transmitted to the master BS by the secondary BS.

12. The method of claim 10, further comprising:
    transmitting information related to the at least one released cell, to the master BS,
    wherein the information related to the at least one released cell is transmitted to the secondary BS by the master BS.

13. The method of claim 1, wherein the UE performs network-controlled mobility in the master BS, and performs UE-centric mobility in the secondary BS.

14. A user equipment (UE) for performing mobility in a wireless communication system, the UE comprising:
    a memory;
    a transceiver; and
    a processor to connect the memory and the transceiver,
    wherein the processor is configured to control the transceiver to:
    establish a connection with a master base station (BS) including a source cell and a target cell;
    control the transceiver to receive a measurement configuration, from the master BS via the source cell;
    control the transceiver to transmit a measurement report based on the measurement configuration, to the master BS via the source cell;
    control the transceiver to receive a handover command message based on the measurement report, from the master BS via the source cell;
    perform a handover from the source cell to the target cell, based on the handover command message;
    control the transceiver to transmit a handover complete message, to the master BS via the target cell;
    control the transceiver to receive a configuration related to UE-centric mobility, wherein the configuration includes a list of cells related to a secondary BS and a mobility rule including a threshold related to channel quality for the cells;
    select at least one cell among the cells based on a quality of the cells and the threshold, without receiving a command related to the selection of the at least one cell from the master BS; and
    control the transceiver to transmit a cell addition message including information related to the at least one selected cell, to the secondary BS.

* * * * *